2,744,027
Patented May 1, 1956

2,744,027
AZO PIGMENT PRODUCTION

William S. Struve, Carneys Point, N. J., and Albert D. Reidinger, Wilmington, Del., assignors to E. I. du Pont de Nemours and Company, Wilmington, Del., a corporation of Delaware No Drawing. Application November 26, 1952,
Serial No. 322,831

8 Claims. (Cl. 106—289)

This invention relates to novel organic pigments, and more particularly to new red and maroon azo pigment mixtures containing predetermined amounts of the azo dye metallic salts comprising diazotized 2-chlor-4-amino-anisole-5-sulfonic acid coupled with 3-hydroxy-2-naphthoic acid.

Red pigments which are useful in printing inks, in pre-colored enamels and in other applications, can be prepared by coupling diazotized 2-chlor-4-amino-toluene-5-sulfonic acid to 3-hydroxy-2-naphthoic acid and then forming the desired calcium or manganese salts thereof. Advantageously, such products are non-bleeding in oil, possess unusually good resistance to many solvents, and exhibit good light-fastness.

U. S. 2,225,665 discloses as useful for pigmenting purposes the manganese salt of the azo dyestuff

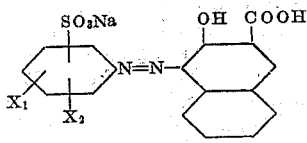

wherein $X_1$ represents a halogen (chlorine, bromine, iodine), $X_2$ represents hydrogen or an alkyl group, and the halogen, alkyl, or $SO_3H$ substituents can be attached to any open position in the benzene ring.

When, however, attempts are made to employ for the same purpose the compound 2-chlor-4-amino-anisole-5-sulfonic acid, as a diazo coupling component with 3-hydroxy-2-naphtholic acid, such attempts result in products possessing no utility in coating compositions because dull and changeable in masstone and weak and dull in tint. X-ray diffraction studies indicate that such products have a characteristically different crystal pattern than those of the technically useful products already known.

It is among the objects of this invention to overcome this disadvantage of the compound mentioned and to provide, in particular, new and technically useful pigments containing, at least in part, diazotized 2-chloro-4-amino-anisole-5-sulfonic acid with 3-hydroxy-2-naphthoic acid as an essential pigmenting ingredient, and which, quite unexpectedly, afford a high quality product useful in coating formulations. These and other objects of this invention are attained by mixing, prior to the formation of the insoluble metallic salt, a predetermined amount of the azo dye from diazotized 2-chloro-4-amino-toluene-5-sulfonic acid and 3-hydroxy-2-naphthoic acid with the azo dye from 2-chloro-4-amino-anisole-5-sulfonic acid and 3-hydroxy-2-naphthoic acid, and thereafter converting the product to an insoluble metal lake.

In one preferred embodiment of the invention, a mixture of a 2-chloro-4-amino-anisole-5-sulfonic acid and 2-chloro-4-amino-toluene-5-sulfonic acid in predetermined proportions is diazotized in the usual manner and added to an alkaline, preferably sodium hydroxide, solution of 3-hydroxy-2-naphthoic acid whereby an intimate mixture of the two azo dyes is obtained as the alkaline salt. The relative amounts of the two azo components can vary. For most uses, at least 25% of the 2-chloro-4-amino-toluene-5-sulfonic acid component must be present, and in many uses it is possible and often preferred that this component be present in much larger proportions, e. g., up to 75% and sometimes as high as 95% of the total. In instances of the preferred calcium and manganese salts of the mixed azo dyes, from 5% to 75% of the dye from 2-chloro-4-amino-anisole-5-sulfonic acid and 95% to 25% of the dye from 2-chloro-4-amino-toluene-5-sulfonic acid can be used, with optimum results being obtained when about 75–85% of the toluene analogue and 25–15% of the anisole analogue are resorted to. The resulting mixture is then converted to the desired metallic salt, such as calcium or manganese by the addition of a solution of a soluble salt (sulfate, chloride, acetate) of the appropriate metal followed usually by heating. The products so obtained are dark and intense in masstone and strong and intense in tint in comparison with a color made from 2 - chloro - 4 - amino-anisole-5-sulfonic acid alone. Examination by X-ray diffraction indicates that the crystalline form of the new and preferred products is also different from that of the pure pigment, made from the anisole analogue. The metallic salts of such mixtures are dark red or maroon pigments with a bluish tint, good intensity of shade, substantially free from bleeding in water, in oil, and in organic solvents, and of good light-fastness. They are generally useful as pigments but have particular utility in the preparation of high quality printing inks and in the preparation of stable, synthetic resin enamels of red to maroon shade and other types of coating compositions such as paints and lacquers. They differ from related prior art pigments in desirable deep, intense masstone and strong, bluish tint.

To a clearer understanding of the invention, the following examples, in which parts given are by weight, are given. These are merely illustrative and not in limitation of the invention.

Example I 5.5 parts of 2-chloro-4-amino-toluene-5-sulfonic acid and 17.8 parts of 2-chloro-4-amino-anisole-5-sulfonic acid (equivalent to a 25:75 ratio on a mol basis) were dissolved in about 600 parts of warm water containing 4.2 parts of sodium hydroxide. After cooling with ice to 0° C., 7 parts of sodium nitrite dissolved in about 25 parts of cold water are added, followed by 10.6 parts of hydrochloric acid 100%.

20 parts of 3:2 hydroxy naphthoic acid were dissolved in 180 parts of warm water by the addition of 8 parts of sodium hydroxide. 8 parts of sodium carbonate were added and the mixture cooled to 15° C. The diazo suspension was then added over a period of about thirty minutes and the dyestuff which formed was finished by heating to 60° C. and filtering.

The isolated soda salt was reslurried in about 4000 parts of water. To the suspension was added about 10 parts of sodium rosinate dissolved in hot water, followed by 30 parts of calcium chloride dissolved in 150 parts of water. The mixture was then heated to the boil and boiled for 10 minutes, after which the pigment was filtered, washed and dried.

The resulting pigment was darker and more intense in masstone and stronger and more intense in tint than a color made from 100% 2-chlor-4-amino-anisole-5-sulfonic acid.

Example II 16.6 parts of 2-chlor-4-amino-toluene-5-sulfonic acid and 5.9 parts of 2-chlor-4-amino-anisole-5-sulfonic acid (equivalent to a 75:25 ratio) were diazotized, coupled and converted to a calcium lake as in Example I. The calcium toner thus prepared was similarly dark and intense in masstone and strong and intense in tint compared to a color made from 100% 2-chlor-4-amino-anisole-5-sulfonic acid.

*Example III*

21 parts of 2-chlor-4-amino-toluene-5-sulfonic acid and 1.2 parts of 2-chlor-4-amino-anisole-5-sulfonic acid (equivalent to a 95:5 ratio) were diazotized, coupled and converted to the calcium salt as in Example I. This product was also much more intense that the color made from 100% 2-chlor-4-amino-anisole-5-sulfonic acid. In addition it was darker and bluer in masstone and bluer in tint than a color made from 100% 2-chlor-4-amino-toluene-5-sulfonic acid.

*Example IV*

16.6 parts of 2-chlor-4-amino-toluene-5-sulfonic acid and 5.9 parts of 2-chlor-4-amino-anisole-5-sulfonic acid (equivalent to a 75:25 ratio) were diazotized and coupled as in Example I.

The isolated soda salt was reslurried in 2500 parts of water. To the suspension was added 3.6 parts of Para soap, followed by 25 parts of manganous sulfate (100%) dissolved in 200 cc. warm water. The mixture was then heated to the boil and boiled for 10 minutes, after which the pigment was filtered, washed and dried.

The resulting pigment was more intense in masstone and stronger and more intense in tint than a manganese toner made from 100% 2-chlor-4-amino-anisole-5-sulfonic acid.

*Example V*

21 parts of 2-chlor-4-amino-toluene-5-sulfonic acid and 1.2 parts of 2-chlor-4-amino-anisole-5-sulfonic acid (equivalent to a 95:5 ratio) were diazotized, coupled and converted to the manganese salt as in Example IV. This product was also much more intense that the manganese pigment from 100% 2-chlor-4-amino-anisole-5-sulfonic acid. In addition, it was darker and bluer in masstone and bluer in tint than the corresponding color made from 100% 2-chlor-4-amino-toluene-5-sulfonic acid.

As already indicated, the relative amounts of the two azo components can vary. However, when the amount of 2-chloro-4-amino-anisole-5-sulfonic acid appreciably exceeds 75% of the total, there is a pronounced tendency for the resulting composition to take on the undesirable characteristics of the pure dye. At the other end of the scale, as little as 5% of this component can be used to give results with marked superiority over the pure pigment from 2-chlor-4-amino-toluene-5-sulfonic acid in darkness of masstone and blueness of tint. Within these limits there is a considerable range in shades possible, and the particular proportions used will depend upon the exact shade desired. A particularly good combination is that shown in Examples II and IV (75% 2-chloro-4-amino-toluene-5-sulfonic acid with 25% 2-chloro-4-amino-anisole-5-sulfonic acid).

Although the examples have shown the use of mixtures of the diazo components prior to diazotization which is preferred because of ease of operation, the mixtures can be prepared in other ways provided the two azo dyes are present in intimate mixture in water suspension prior to the conversion to the insoluble heavy metal salt. Thus, the two diazo components can be separately diazotized and added either simultaneously or in succession to the coupling bath. Furthermore, the two dyes can be separately prepared and then mixed prior to the addition of the heavy metal salt.

Although in the examples calcium and manganese are employed as the metallic components of the final insoluble pigments, other metals can be used and are contemplated as within the scope of the invention. Thus, the metals barium and strontium can be used, as can cadmium, copper, chromium, nickel, iron, and the like.

The conditions of coupling, such as temperature, concentration, pH and the like, although influencing the color to some extent, are not critical to the invention and can be varied within substantial limits as will be apparent to the skilled in the art.

Likewise, the conditions of conversion to the metal salt are conventional and not critical, though preferably the conversion is effected under slightly alkaline conditions and at a temperature near the boil.

Although in the examples isolation of the mixed soda salts of the dyes is brought about by filtration from the coupling, this is not an essential step in the invention. It probably results in some purification and provides more intense products but entirely acceptable pigments may be prepared by the conversion of the coupled dyes directly to the metallic salts without isolation.

The coprecipitation of a metallic resinate with the pigment, as shown in Example I, is a well-known operation in the preparation of azo pigments and is in accordance with the procedures disclosed in U. S. Reissue Patent No. 18,750, which are also contemplated as useful herein. It frequently results in more intense colors and is often preferred for this reason. However, such treatment is not an essential part of this invention since the characteristic superiority of the mixed pigment can be obtained without recourse to such treatment.

We claim as our invention:

1. As a new insoluble azo pigment, the co-precipitated metallized salts of a mixture of from 5% to 75% of the dye from diazotized 2-chloro-4-amino-anisole-5-sulfonic acid with 3-hydroxy-2-naphthoic acid and from 95% to 25% of the dye from diazotized 2-chloro-4-amino-toluene-5-sulfonic acid with 3-hydroxy-2-naphthoic acid.

2. As a new insoluble azo pigment, the co-precipitated manganese salts of a mixture of from 5% to 75% of the dye from diazotized 2-chloro-4-amino-anisole-5-sulfonic acid with 3-hydroxy-2-naphthoic acid and from 95% to 25% of the dye from diazotized 2-chloro-4-amino-toluene-5-sulfonic acid with 3-hydroxy-2-naphthoic acid.

3. As a new insoluble azo pigment, the co-precipitated calcium salts of a mixture of from 5% to 75% of the dye from diazotized 2-chloro-4-amino-anisole-5-sulfonic acid with 3-hydroxy-2-naphthoic acid and from 95% to 25% of the dye from diazotized 2-chloro-4-amino-toluene-5-sulfonic acid with 3-hydroxy-2-naphthoic acid.

4. A process for producing an insoluble azo pigment comprising mixing from 5% to 75% of the azo dye from diazotized 2-chloro-4-amino-anisole-5-sulfonic acid with 3-hydroxy-2-naphthoic acid, with from 95% to 25% of the dye from diazotized 2-chloro-4-amino-toluene-5-sulfonic acid with 3-hydroxy-2-naphthoic acid, and then converting the mixed dyes to an insoluble metal lake.

5. A process for producing an insoluble azo pigment comprising mixing from 5% to 75% of the azo dye from diazotized 2-chloro-4-amino-anisole-5-sulfonic acid with 3-hydroxy-2-naphthoic acid, with from 95% to 25% of the dye from diazotized 2-chloro-4-amino-toluene-5-sulfonic acid with 3-hydroxy-2-naphthoic acid, and then converting the mixed dyes to a manganese lake.

6. A process for producing an insoluble azo pigment comprising mixing from 5% to 75% of the azo dye from diazotized 2-chloro-4-amino-anisole-5-sulfonic acid with 3-hydroxy-2-naphthoic acid, with from 95% to 25% of the dye from diazotized 2-chloro-4-amino-toluene-5-sulfonic acid with 3-hydroxy-2-naphthoic acid, and then converting the mixed dyes to a calcium lake.

7. A process for producing an insoluble azo pigment comprising mixing from 75% to 85% of the azo dye from diazotized 2-chloro-4-amino-anisole-5-sulfonic acid with 3-hydroxy-2-naphthoic acid, with from 25% to 15% of the dye from diazotized 2-chloro-4-amino-toluene-5-sulfonic acid with 3-hydroxy-2-naphthoic acid, and then converting the mixed dyes to a manganese lake.

8. A process for producing an insoluble azo pigment comprising mixing from 75% to 85% of the azo dye from diazotized 2-chloro-4-amino-anisole-5-sulfonic acid with 3-hydroxy-2-naphthoic acid, with from 25% to 15% of the dye from diazotized 2-chloro-4-amino-toluene-5-sulfonic acid with 3-hydroxy-2-naphthoic acid, and then converting the mixed dyes to a calcium lake.

References Cited in the file of this patent
UNITED STATES PATENTS

| | | |
|---|---|---|
| 2,013,100 | Headley et al. | Sept. 3, 1935 |
| 2,115,412 | Dahlen et al. | Apr. 26, 1938 |
| 2,117,859 | Siegel | May 17, 1938 |
| 2,229,049 | Dahlen et al. | Jan. 21, 1941 |